United States Patent
Bui et al.

(10) Patent No.: US 6,239,939 B1
(45) Date of Patent: May 29, 2001

(54) ROBUST DETECTION OF DATA MODULATED INTO A TIMING BASED SERVO

(75) Inventors: Nhan Xuan Bui, Tucson, AZ (US); Junichi Fukuda, Sagamihara (JP); Glen Alan Jaquette; John Alexander Koski, both of Tucson, AZ (US); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/370,256

(22) Filed: Aug. 9, 1999

(51) Int. Cl.$^7$ .............................. G11B 5/584; G11B 5/55; G11B 5/09
(52) U.S. Cl. ..................... 360/77.12; 360/51; 360/78.02
(58) Field of Search .................................. 360/51, 77.12, 360/78.02

(56) References Cited

U.S. PATENT DOCUMENTS

| | | | |
|---|---|---|---|
| 3,714,382 | 1/1973 | Sykes | 179/100.2 S |
| 4,296,491 | 10/1981 | Jerome | 369/59 |
| 4,752,846 | 6/1988 | Proehl | 360/72.2 |
| 5,325,370 | 6/1994 | Cleveland et al. | 371/37.4 |
| 5,341,356 | 8/1994 | Dieleman et al. | 369/47 |
| 5,689,384 | 11/1997 | Albrecht et al. | 360/77.12 |

*Primary Examiner*—Regina Y. Neal
(74) *Attorney, Agent, or Firm*—John H. Holcombe; Robert M. Sullivan

(57) ABSTRACT

A detector and method for detecting data modulated into a timing based servo pattern prerecorded on a media, comprising shifts of pairs of non-parallel transition stripes arranged in a frame of two bursts. Timing intervals between sequential transition stripes are detected. Interval comparison logic compares selected timing intervals and indicates whether the compared intervals represent a "0", or a "1". First and second counters respectively increment the number of the compared intervals representing a "0" and representing a "1" in each frame. Bit comparison logic compares, for each frame, the incremented numbers representing a "0" and a "1" to a predetermined criteria and, upon one of the numbers meeting the criteria, identifies the corresponding "0" or "1" as the bit value for the frame. The bits are data comprising longitudinal position words arranged in a linear sequence. Sequence logic calculates the next sequential position word from an immediately preceding word and determines whether the detected word is in the linear sequence as a validity check, and provides the calculated word as the output. Thus, the correct position word is provided at the output even if the detected word is invalid.

24 Claims, 8 Drawing Sheets

ROBUST DETECTION OF DATA MODULATED INTO A TIMING BASED SERVO

DOCUMENTS INCORPORATED BY REFERENCE

Commonly assigned U.S. Pat. No. 5,930,065 (Ser. No. 08/859,830), Albrecht et al., is incorporated for its showing of a magnetic tape media having data information superimposed on prerecorded track following servo information.

FIELD OF THE INVENTION

This invention relates to timing based servo systems for longitudinal recording, and, more particularly, to the detection of data modulated into the timing based servo pattern prerecorded on a media in the presence of errors.

BACKGROUND OF THE INVENTION

Typically, longitudinal media, such as magnetic tape or optical tape, is employed as a secondary storage media for storing large amounts of data which is accessed sequentially or infrequently (such as archival). To accommodate the large amounts of data, the tracks are placed closely together and a track following servo system is employed to allow the tape head to accurately follow the data tracks.

An example of a track following servo system particularly adapted to tape comprises a timing based servo pattern described in coassigned U.S. Pat. No. 5,689,384. The servo patterns are comprised of magnetic flux transitions recorded in continuous lengths at non-parallel angles, such that the timing between the servo transitions read from the servo pattern at any point on the pattern varies continuously as the head is moved across the width of the servo pattern. Thus, the relative timing of transitions read by a servo read head varies linearly depending on the lateral position of the head. Speed invariance is provided by utilizing a group of interlaced pairs of transitions and determining the ratio of two timing intervals, the interval between two like transitions ratioed with the interval between two dissimilar transitions. Synchronization of the decoder to the servo pattern may be accomplished by having two separate groups of pairs of transitions, each group having a different number of pairs of transitions. Thus, the position in the set of groups is readily determined by knowing the number of pairs of transitions in the present group.

In addition, the determination of the longitudinal position of the tape is important. Often, the data is transferred to the longitudinal media for writing on the media by streaming. Similarly, the data is often read on a continuous basis for much of the data. The data transfer is, however, often subject to interruption while the media continues to move at its continuous nominal velocity. Thus, the media must be stopped, and later restarted. On restart, the media position must be correlated and resynchronized with respect to the data set sequence.

Hence, as described in the incorporated Albrecht et al. patent, in addition to the determination of the lateral position of a head with respect to the width of a tape by means of the timing based servo pattern, data may be modulated into, or superimposed on, the servo pattern to allow determination of the longitudinal position of a tape. In one example, a pair of transitions are each oppositely facing slanted lines formed into groups, or "frames", of multiple pairs of transitions, the similarly sloped transitions of each pair arranged together in a burst, with the bursts and the frames each separated by servo gaps. In one embodiment, at least one transition of the repeated pairs in a frame is shifted longitudinally with respect to other of the transitions, the shifted transitions comprising the modulated data information.

Data information of the type proposed by the incorporated Albrecht et al. patent is employed to provide prerecorded longitudinal position registration data information in the timing based servo patterns of the longitudinal servo track. As an example, the servo information comprises alternating 5 and 4 servo frames wherein each bit of the longitudinal position information is encoded into a pair of the bursts of a 5 servo frame by shifting the longitudinal position of the stripes of the pair in opposite directions, shifts of the pair in first directions representing a "1", and shifts in the second, opposite, directions representing a "0". The absolute location along the length of tape is represented by a "Longitudinal POSition", or "LPOS", word composed of 36 bits from 36 frames, consisting of 24 bits forming a position word, a 4-bit symbol (such as manufacturer's or user's data) and an 8-bit synchronization mark. The bits are typically detected by detecting the shifts of the pairs in the first or the second directions by measuring the intervals between each shifted transition stripe and the adjacent unshifted transition stripes.

Media debris and defects can cause extra flux transitions to be detected or inhibit detection of written flux transitions. Measurement of the intervals for each shifted transition stripe is not possible in the presence of these errors. But, the modulated longitudinal position data is required on a constant basis to provide accurate longitudinal positioning of the tape and therefore must be reliably detected. In normal data recording, extensive error correction codes are provided which allow detection and correction of errors. However, no error correction bytes are allowed under the current standard for LPOS words. Doing so would increase the length of the LPOS words, possibly unacceptably.

SUMMARY OF THE INVENTION

An object of the present invention is to provide a robust detection of each bit modulated into the timing based servo pattern, and to provide a robust detection of each position word of the data modulated into the timing based servo pattern.

Disclosed are a detector and method for detecting data - modulated into a timing based servo pattern prerecorded on a media. The timing based servo pattern has frames of repeated pairs of non-parallel transition stripes arranged in two bursts, one of each of the pairs in one of the bursts, the bursts separated by servo gaps, with ones of the frames having the modulated data. The modulated data comprises shifts of two of the pairs of transition stripes in the longitudinal direction of the media relative to the other of the pairs of transitions stripes, the shifts of ones of the pairs in first directions representing a binary "0", and the shifts of ones of the pairs in second directions, opposite to the first directions, representing a binary "1". A servo system detects the transition stripes in the longitudinal direction of the media during relative motion with respect to the media.

An interval detector then detects the timing interval between selected sequential transition stripes within the bursts in the ones of the frames having the modulated data. Interval comparison logic, coupled to the interval detector, compares selected ones of the detected timing intervals to other selected ones of the detected timing intervals and provides signals indicating whether the compared selected timing intervals identify a shift of the transition stripes representing a "0", or a "1". A first counter coupled to the interval comparison logic and responsive to each signal indicating the compared selected timing intervals represent a "0", increments the number of the compared selected timing intervals representing a "0" in each detected frame, resetting the incremented number to zero at the beginning of each detected frame. A second counter coupled to the interval comparison logic and responsive to each signal indicating the compared selected timing intervals represent a "1", increments the number of the compared selected timing intervals representing a "1" in each detected frame, resetting the incremented number to zero at the beginning of each detected frame. Bit comparison logic, coupled to the first and second counters, compares, at the end of each detected frame, the incremented numbers representing a "0" and representing a "1" to a predetermined criteria, determining which of the incremented numbers meets the criteria, and, upon one of the "0" or "1" incremented numbers meeting the criteria, provides an output signal identifying the corresponding "0" or "1" as the bit value for the detected frame.

The identified bit values for each of the detected frames for a position word are accumulated in a buffer coupled to the bit comparison logic, and a validity detector determines whether the position word stored in the buffer is valid, and, if valid, provides a signal identifying the stored position word as "valid". The validity may be determined by determining whether each bit of the position word stored in the buffer is valid and/or by sequence logic.

In one embodiment, the longitudinal position data comprises a linear sequence of position words. The sequence logic calculates the next sequential position word from an immediately preceding position word and determines whether the stored position word is sequential in the linear sequence.

Additionally, the sequence logic provides the calculated next sequential position word at an output. Thus, the correct LPOS value is provided at the output even if the detected position word is invalid.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
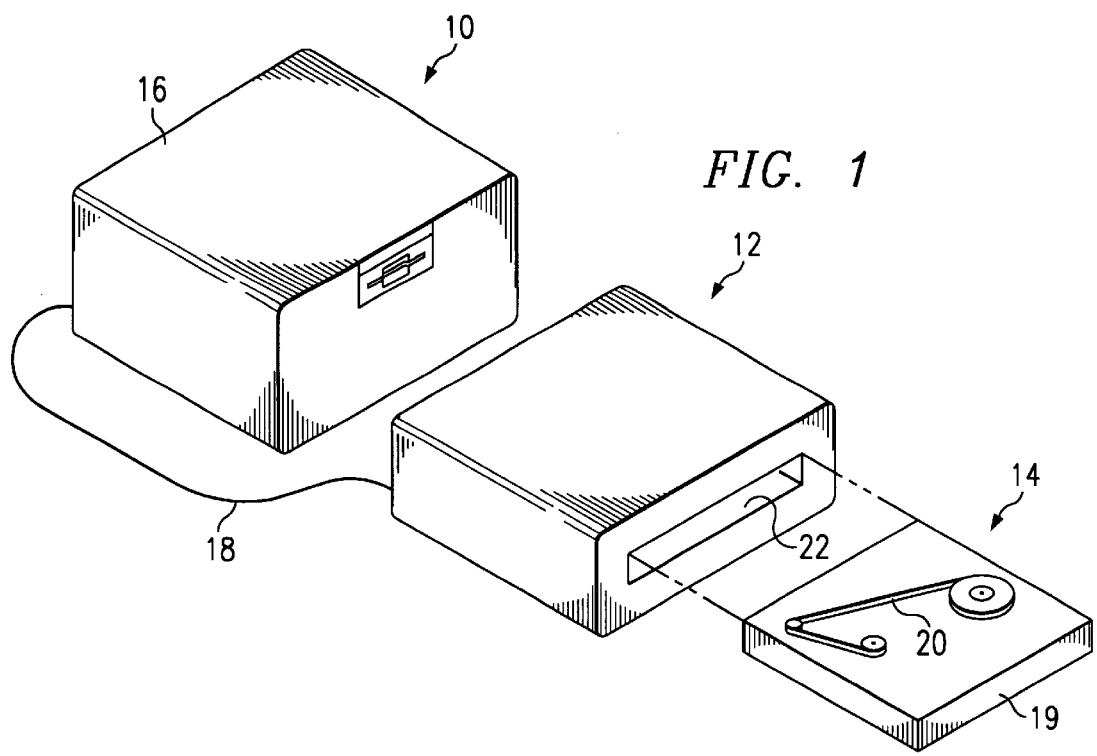
FIG. 1 is a perspective view representation of a tape drive data storage device and associated tape cartridge in accordance with an embodiment of the present invention.
Figure 2:
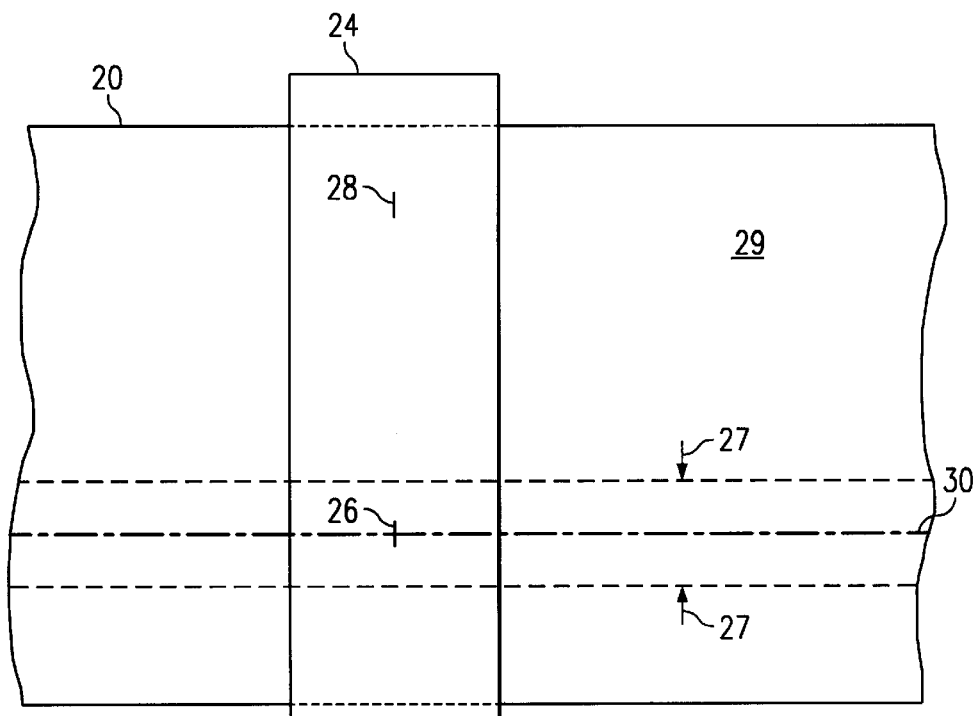
FIG. 2 is a schematic representation of a tape drive data storage device with a data detector and associated tape cartridge showing one servo track in accordance with an embodiment of the present invention.

Referring to FIGS. 1 and 2, a data storage system is illustrated including tape drive data storage device 12, such as a magnetic tape drive, and associated tape cartridge 14, with a data detector 15 in accordance with the present invention. Referring to FIG. 1, the tape drive 12 accepts tape cartridge 14, which stores data in the form of data sets to be read and/or written by the tape drive 12, and is connected to a host processor 16 by a cable 18. The tape cartridge 14 comprises a housing 19 containing a length of tape 20, such as magnetic tape. Examples of magnetic tape cartridges include single reel cartridges such as the IBM "3590", "Digital Linear Tape", or dual reel cartridges such as "Travan" or IBM "3570". Alternatively, the tape drive 12 may comprise an optical tape drive, and tape cartridge 14 may comprise an optical media. The tape drive 12 includes a receiving slot 22 into which the cartridge 14 is inserted. The host processor 16 can comprise any suitable processor, for example, a personal computer such as the IBM "Aptiva", or can be a workstation such as the IBM "IRS6000", or can be a systems computer, such as the IBM "AS400". The tape drive 12 is preferably compatible with the associated host rocessors and can assume any one of a variety of cartridge or cassette linear formats. Examples of such tape drives include the IBM "3490" tape drive units, or "Digital Linear Tape" or "Travan" compatible tape drives.

Referring to FIG. 2, such tape drives typically include drive motors (not shown) for rotating the reels of the cartridge 14 to move the tape 20 across a head assembly 24. The head assembly is shown in solid lines and includes a relatively narrow servo read head 26 that detects a servo pattern recorded in a servo track 27 of the tape. A data head 28 of the head assembly is typically larger than the servo head and is positioned over a data track region 29 of the tape containing multiple data tracks for reading data recorded in a data track, or for writing data in a data track. FIG. 2 shows a single servo read head and a single data head for simplicity of illustration. Those skilled in the art will appreciate that most tape systems have multiple parallel servo tracks, multiple servo read heads, and multiple data read and write heads.

The servo track centerline 30 is indicated as extending along the length of the tape 20. The servo read head 26 is relatively narrow and has a width substantially less than the width of the servo track 27. In accordance with the incorporated Albrecht et al. patent, the tape is moved longitudinally across the tape head assembly 24 so that the servo track 27 is moved linearly with respect to the servo head 26. When such movement occurs, the servo pattern of magnetic flux transitions is detected by the servo read head 26 so that it generates an analog servo read head signal that is provided via a servo signal line 34 to a signal decoder 36. The signal decoder processes the servo read head signal and generates a lateral position signal that is transmitted via position signal lines 38 to a servo controller 40. The servo controller generates a servo control signal and provides it on control lines 42 to a servo positioning mechanism at head assembly 24. The servo positioning mechanism responds to the control signal from the servo controller by moving the assembly including servo head 26 laterally with respect to the servo track centerline 30 to reach the desired servo track or to maintain the servo head 26 centered with respect to the servo track centerline 30.

As discussed above, the data is typically transferred to or from the tape media by streaming. The data transfer is, however, often subject to interruption while the media continues to move at its continuous nominal velocity. Thus, the media must be stopped, and later restarted.

On restart, the media position must be correlated and resynchronized with respect to the data set sequence. The tape drive 12 repositions the tape media backwards by back hitching by operating the drive motor in the reverse direction for a defined period of time. The back hitch is therefore of an approximate linear distance, and the tape motion is restarted so that the tape is up to speed by the time it reaches the point at which the data transfer ended. The present invention provides data which may be used to synchronize the data sets to the linear position of the tape for restarting the data transfer. Thus, the data transfer begins at exactly the point at which it was stopped, or at a desired offset.

The incorporated Albrecht et al. patent discloses a magnetic tape media having data information superimposed on, or modulated into, prerecorded track following servo information. The servo information is recorded in magnetic flux transition patterns defining at least one longitudinal servo track. A servo burst pattern of at least two repeated pairs of non-parallel magnetic flux transition stripes is provided, which are slanted or otherwise continuously longitudinally variable in different directions across the width of the servo track. In one example, the transition stripes are each oppositely facing chevrons, each pair of transition stripes thereby forming a "diamond". The pairs of transition stripes are formed into groups or frames of multiple pairs of transition stripes. In one embodiment, at least one transition stripe of the repeated pairs in a group is shifted longitudinally with respect to other of the transition stripes, the shifted transition stripes comprising the superimposed data information.

Data information of the type proposed by Albrecht et al., is detected by detector 15, in accordance with the present invention, to provide position words which comprise linear position registration data information.

Figure 3:
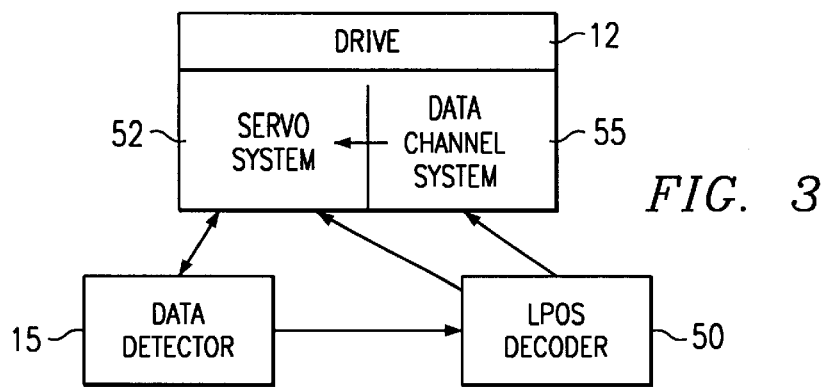
FIG. 3 is a block diagram of a tape drive data storage device and linear position system employing the data detector of FIGS. 1 and 2.

FIG. 3 illustrates one embodiment of a linear positioning system employing the data detector of the present invention. Referring to FIG. 3, the servo system 52 decodes the data from the servo signal on the servo track. The data detector 15 detects the linear positioning (LPOS) position words, and provides the position words to a linear position decoder 50 which detects the prerecorded linear position registration data from the detected position words. The linear position registration data is encoded as a sequence of position words, which are continually incremented in a first direction over the entire length of tape, and appear as an opposite sequence in the opposite direction over the length of tape. Each position word is therefore of sufficient length to provide a large number of bits of registration data so that, preferably, the registration data may be recorded as sequential data which will not be repeated in the entire length of tape.

Herein, the term "position word" represents either the linear position registration (LPOS) word or the entire set of data including the LPOS word, the synchronization mark and any other associated symbol, and the term "increment" represents either a single increase in the binary numerical sequence of the LPOS words in one direction or a single decrease in the opposite direction.

At some point, the recording media may be stopped. The stoppage may be due to an interruption in the data transfer, as discussed above. Alternatively, the data transfer may be complete. Thus, the media, instead of restarting, may be rewound and removed from the drive 12. The linear position registration information, derived from the LPOS decoder 50, at the end of the last data set of the data transfer, is stored.

If the data transfer was interrupted, the recording media must be back hitched and later restarted. The drive 12 accelerates the recording media up to the correct speed to allow the servo system to center the tape head.

After the tape drive 12 back hitches the recording media and restarts the movement of the media, the media position must be correlated and resynchronized with respect to the data set sequence.

The linear position registration information, derived from the LPOS decoder 50, is again read and is compared to the stored linear position registration information. Upon detecting a comparison, the identical linear position, or a desired offset, of the recording media has been reached, and the data channel system 55 initiates a continuation of the data transfer, such a read operation or a write append operation, synchronizing the reading and/or writing of data sets on the recording media.

Figure 4:
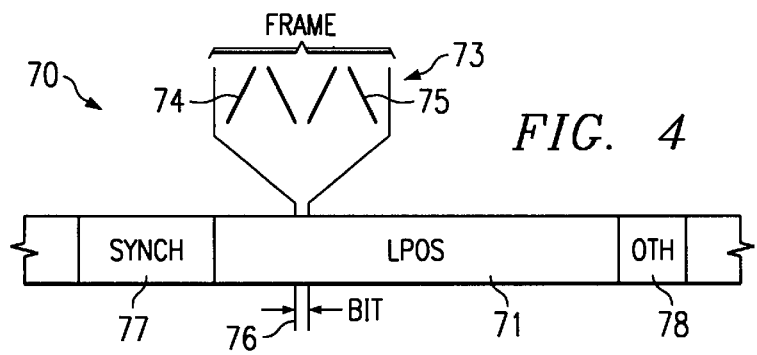
FIG. 4 is a schematic representation of an embodiment of magnetic tape media having prerecorded information, which may represent linear position registration data information, recorded in magnetic flux transition servo patterns defining at least one longitudinal servo track in accordance with the present invention.

FIG. 4 illustrates a recording media 70, such as a magnetic tape media, having prerecorded interpolatable linear position registration data information 71 recorded, for example, in magnetic flux transition servo patterns, defining at least one longitudinal servo track. The data of the servo track comprises a plurality of frames 73 of alternating groups of burst patterns 74 and 75.

In accordance with one embodiment of the present invention, one bit 76 of linear position registration data 71 is provided in each frame. The data in the servo track preferably includes a synchronization character 77 followed by the longitudinal position data 71, and may be followed by other data 78, such as data supplied by the media manufacturer. As an example, the synchronization character may comprise an 8 bit character, such as a "1" bit followed by 7 "0" bits. The synchronization character provides a means of identifying the beginning of each word of linear position registration data.

As discussed above, the linear position registration data 71 is encoded into the servo track over a length of tape sufficient to provide a large number of bits of registration data so that, referably, the registration data may be recorded as sequential data which will not be repeated in the entire length of tape. The servo tracks containing the linear position registration data may be recorded into the recording media at a stage prior to cutting the recording media into individual media. As the result, the linear position registration sequence may not begin at a low number in the total sequence, but rather may begin at any number in the total sequence.

As an example, the total word may comprise a linear position registration word 71 having a large number of bits, such as 24 bits (logically organized into six 4-bit symbols), and an accompanying synchronization character 77 (e.g., 8 bits) and other data 78 (e.g., a symbol of 4 bits). In accordance with one embodiment of the invention, each frame 73 comprises two groups of patterns 74 and 75, and the total linear position registration data pattern comprises an 8 bit synchronization character 77, a 24 bit linear position registration data word 71, and 4 bits of other data, for a total of 36 bits 76 and 36 frames 73.

Figure 5A:
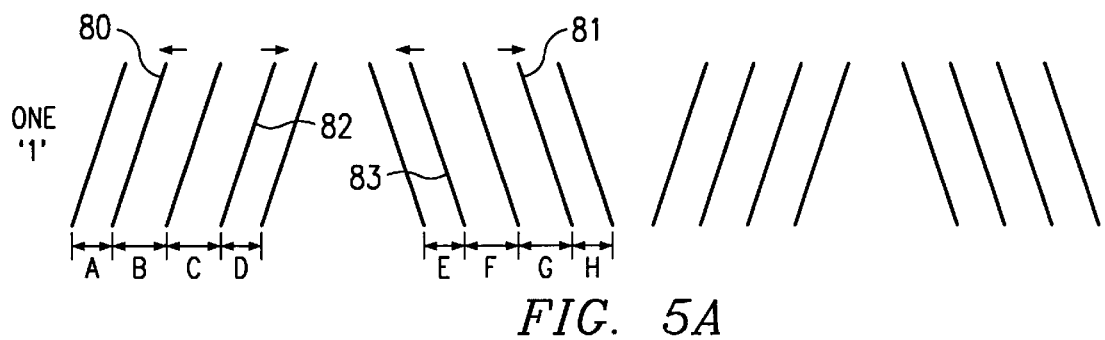
FIGS. 5A and 5B are a representations of coded "5,4" servo patterns encoding, respectively, a "1" and a "0" bit, which may be implemented in accordance with a preferred embodiment of the present invention.
Figure 5B:
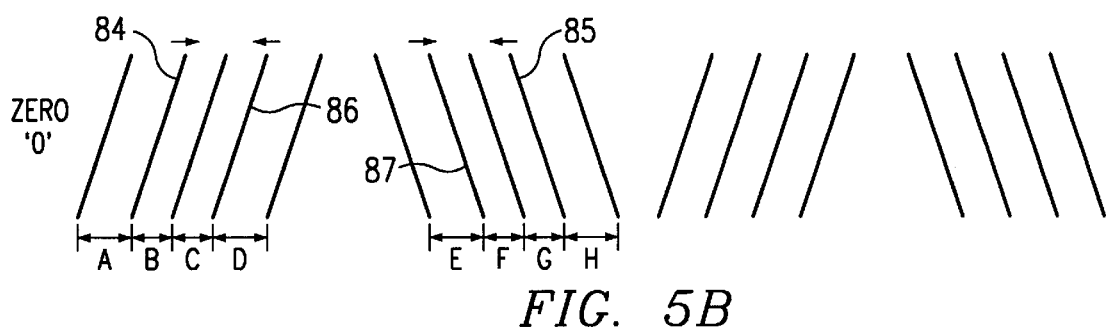

In accordance with the Albrecht et al. patent, FIGS. 5A and 5B illustrate examples of servo patterns in which data may be encoded or modulated into the servo pattern. The minimum number of transition stripes in a frame that can be used to generate a servo position error signal and to encode data is a single pair of the transition stripes, each transition stripe of the pair in a separate burst of similarly sloped transition stripes. In the illustrated example of a "5,4" frame of two groups, two pairs of transition stripes of the 5 stripe group are employed. As illustrated in FIG. 5A, a "1" is encoded by moving the transition stripes 80 and 81 apart, and moving the transition stripes 82 and 83 closer together. As illustrated in FIG. 5B, a "0" is encoded by moving the transition stripes 84 and 85 closer together, and moving the transition stripes 86 and 87 apart. The distance each transition stripe of the pair is moved is identical in magnitude but opposite in direction. In FIGS. 5A and 5B, the 4 stripe group is unchanged and represents the normal spacing of the transition stripes without data.

Hence, in FIG. 5A, the encoded "1" intervals between transition stripes "a", "d", "e" and "h" are reduced, and the intervals "b", "c", "f" and "g" are increased. In FIG. 5B, the encoded "0" intervals between transition stripes "a", "d", "e" and "h" are increased, and the intervals "b", "c", "f" and "g" are reduced.

Typically, the intervals on either side of each transition stripe are measured as timing intervals between detected peaks of the servo transition stripe pulses, and the timing intervals are compared to determine whether a "1" or a "0" is encoded. An example of this algorithm is that:

"1"=(a<b), and (c>d), and (e<f), and (g>h);

"0"=(a>b), and (c<d), and (e>f), and (g<h).

Alternatively, the timing intervals between peaks of the transition stripes pulses, detected from stripes that are respectively increased or reduced, may be separately summed. An example of this algorithm is that:

"1"=(a+d+e+h)<(b+c+f+g);

"0"(a+d+e+h)>(b+c+f+g).

The difficulty with these algorithms is that if one or more of these peak timing intervals is measured incorrectly, or is unmeasurable, incorrect bits are generated or the detection is found to be invalid.

As discussed above, a total LPOS word may include a synchronization mark, the LPOS position word, and another symbol. Typically, a sequence of 36 frames of bits detected from the timing intervals is shifted into a shift register, and, since the tape may be moving either in a forward or a reverse direction, the bits may be shifted in either the forward or reverse direction, a search is made for the synchronization mark, and the adjacent bits decoded by lookup in a table to determine the LPOS from a table. The algorithm has no room for error tolerance since it generates a LPOS from every 36 frames. If a single bit is decoded erroneously, the LPOS position word will be incorrect or missed.

Figure 6:
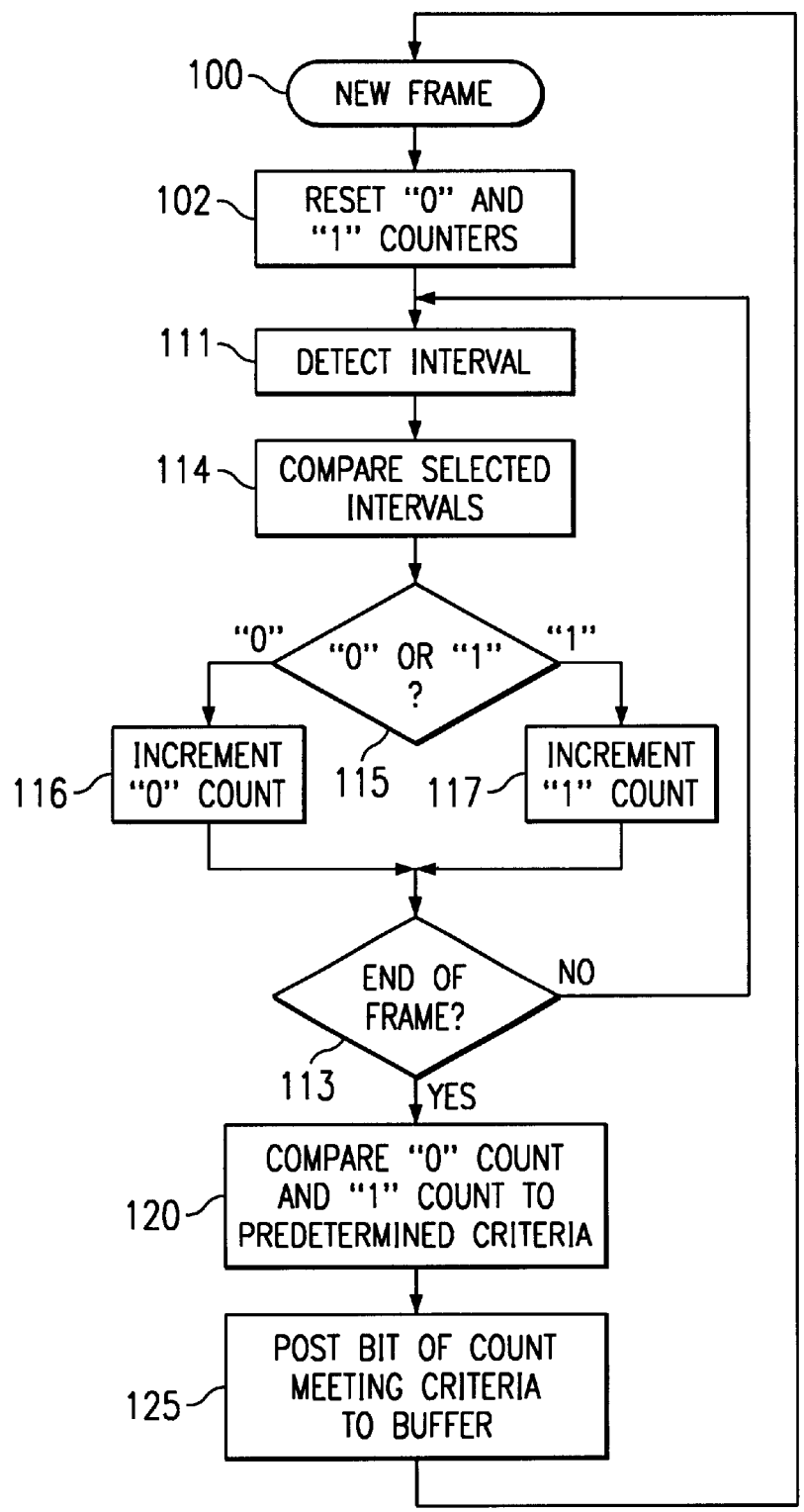
FIGS. 6 and 7 are flow charts depicting, respectively, bit detection and position word detection, in accordance with an embodiment of the method of the present invention.
Figure 7:
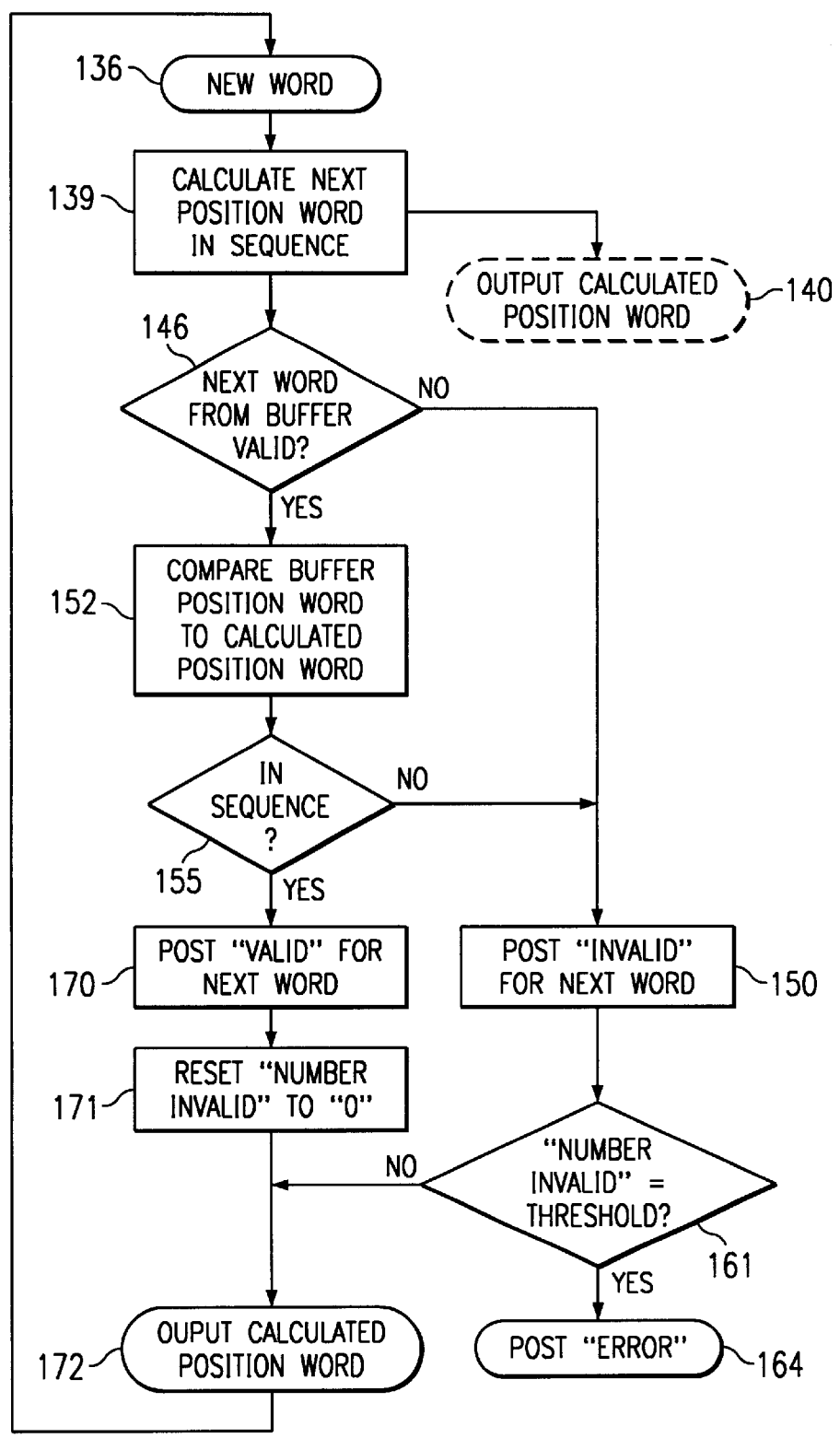
Figure 8:
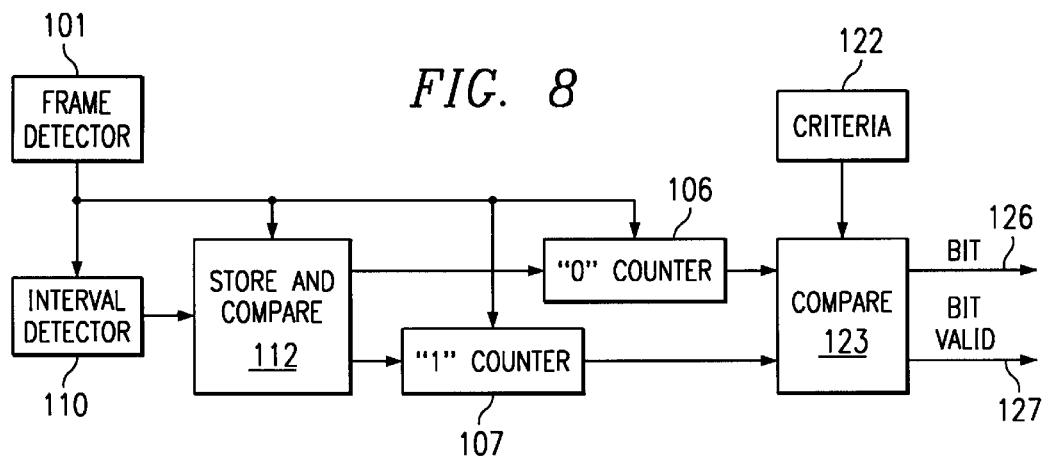
FIGS. 8 and 9 are block diagrams of, respectively, a bit detector and a position word detector, in accordance with an embodiment of the present invention.
Figure 9:
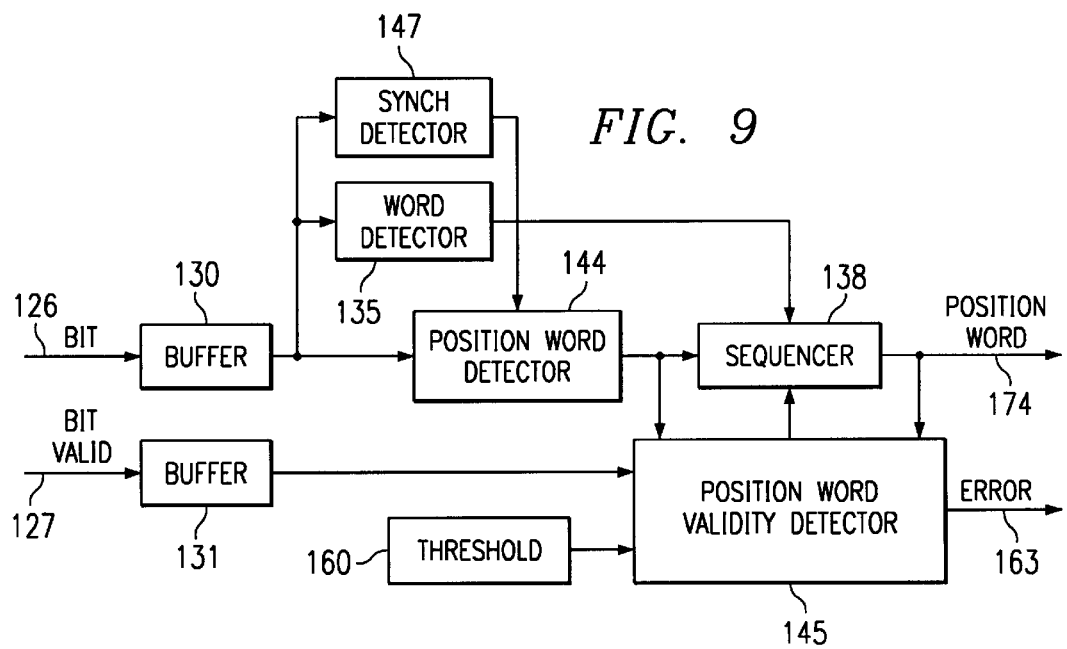

FIGS. 6 and 7 illustrate an embodiment of the method of the present invention for the robust detection of, respectively, encoded bits and position words, and FIGS. 8 and 9 illustrate an embodiment of, respectively, a bit detector and a position word detector, in accordance with the present invention.

Referring to FIGS. 6 and 8, with reference to FIGS. 5A and 5B, the method of robust detection of the encoded bit of each frame by a robust detector is discussed. At step 100, frame detector 101 detects the end of one frame and the beginning of the next. This is accomplished by the detection of the gap between the previous frame and the new frame. The frame detector 101 is a part of the servo system, and tracks the gaps between the 4 transition and 5 transition groups, and the gaps within the groups, separating the pairs of transition stripes. Based on the direction of motion of the tape and the sequence of gaps, the -frame detector 101 determines the beginning of a new frame and the point at which the timing intervals between transition stripes represents the intervals between the transition stripes of an encoded 5 transition group.

Upon the detection of the new frame, in step 102, the signal from the frame detector resets counters 106 and 107 to an initial state, such as "0". Also, interval detector 110, in step 111, begins the detection of the timing intervals between the peaks detected by the servo system. The interval detector may also be a part of the servo system. Step 111 continues to detect the intervals between peaks for the 5 transition stripe group for the entire frame, and until a detection of the end of the frame, in step 113.

In accordance with the present invention, store and compare logic 112, in step 114, separately compares selected ones of the measured timing intervals between detected peaks. The selection of each compared timing intervals is made to detect a relationship between the timing intervals representing one increased and one reduced interval for the bit. In the example of FIGS. 5A and 5B, timing intervals "a" and "b" are compared, timing intervals "c" and "d" are compared, timing intervals "e" and "f" are compared, and timing intervals "g" and "h" are compared. Hence, the shift of each transition stripe, as determined by the timing intervals between the detected peaks, is detected separately. Alternative selections may be made in accordance with the present invention, each representing a separate comparison of an increased interval to a reduced interval.

Thus, should the measured timing interval "a" be greater than that of timing interval "b", transition stripe 84 has likely been shifted toward transition stripe 85, representing a "0". Similarly, should the measured timing interval "c" be less than that of timing interval "d", transition stripe 86 has likely been shifted away from transition stripe 87, also representing a "0", etc.

In step 115, each comparison by logic 112 determining that the timing intervals represent a "0" increments, in step 116, counter 106, and each comparison determining that the timing intervals represent a "1" increments, in step 117, counter 107.

The comparisons of step 114 and determinations made in step 115 may be represented by the following table:

|      | Increment "1" Count | Increment "0" Count | Hold Both counts |
|------|---------------------|---------------------|------------------|
| a, b | a < b               | a > b               | a = b            |
| c, d | c > d               | c < d               | c = d            |
| e, f | e < f               | e > f               | e = f            |
| g, h | g > h               | g < h               | g = h            |

Thus, any one of the comparisons incrementing the respective counter may define whether the bit is a "1" or a "0". In accordance with the present invention, no single comparison need be relied on and not all of the comparisons are required.

In step 113, if the end of the frame has not been reached, the process cycles back to in step 111 to detect the next timing interval, and the count of the appropriate counter continues to be incremented.

At the end of the frame, step 113 directs the process to step 120.

In accordance with the present invention, in step 120, a criteria 122 is provided to compare logic 123, and both the count of "0" counter 106 and "1" counter 107 are compared to the criteria. The criteria is a predetermined count at which the decision will be made as to whether a "0" or a "1" is detected from the timing interval comparisons. As stated above, a single comparison, or criteria of a count of one, may indicate the bit. However, if a transition stripe is misdetected, both counters may exhibit a count of one. At the other extreme, all of the comparisons may be required to determine the bit, in the instant example, by employing a predetermined criteria of a count of four. However, if a transition stripe is missed, no detection would be made.

Hence, the selected predetermined criteria is preferably set at a level such that a "majority vote" between the counters determines the bit. A criteria less than a perfect four allows detection to be made in the presence of defects, and provides a robust detection of each bit. In the instant example, a criteria of two allows considerable toleration of a burst defect, and a criteria of three is less likely to provide detection in the presence of a defect. For example, if the encoded bit is a "0", it is unlikely that two of the four comparisons would be a "1", and a failure to detect two of the peaks would still result in a detection of the bit. If the two missed peaks are in the same burst, the detection tolerates a defect which covers the entire burst.

Hence, with a predetermined criteria of 2, if both counters ("0" and "1") equal 2, the detection fails, but if either is at least 2, and the other is less than 2, the former is qualified as valid.

Thus, in step 125, compare logic 123 posts the "0" or the "1" bit representing the counter meeting the predetermined criteria on line 126. In the example of FIG. 8, the "1" bit may be an active signal on line 126, while a "0" bit may be an inactive signal. To indicate that a "0" or a "1" bit is present, a "bit valid" signal is posted on line 127 at the appropriate clock time. The process of FIG. 6 then cycles back to step 100 to detect the bit of the next frame.

Referring to FIGS. 7 and 9, the method of robust detection of the encoded position word by a robust detector is discussed. The bit line 126 and the "bit valid" line 127 of FIG. 8 are coupled, respectively, to buffers 130 and 131. Thus, buffer 130 will shift in the detected bits comprising the total word, and buffer 131 shifts in the "bit valid" signals. A valid word will have all "1" in the buffer 131.

The robust detector of the present invention determines its controls by its own state behavior.

As discussed above, each total word begins (in one direction of reading) or ends (in the opposite direction of reading) with a synchronization mark, and the total word is fixed in length, such as 36 bits. Thus, knowing the direction of reading, word detector 135, in step 136, identifies the completion of the entry of the word in buffer 130. In accordance with the present invention, sequencer 138, in step 139, calculates, from the previous position word, the next position word in the sequence. Thus, depending on the direction of the tape, the sequencer 138 increments or decrements the previous position word to the next position word in the linear sequence.

In this manner, the next position word is known and may be output at any time, such as in step 140. The content of buffer 130 is provided to position word detector 144, which detects the position word, separating it from the synchronization mark. The content of buffer 131 is provided to position word validity detector 145, which comprises logic to detect whether the detected position word is valid. A first test is to sense, in step 146, whether the word from the buffer 130 is valid, conducted by sensing whether the content of buffer 131 is all "1"s, and whether the full word has been received. Additionally, synch mark detector 147 determines whether the synchronization mark is detected. The full word is determined by counting the number of identified bits and comparing the count to a predetermined number, which number comprises the total number of bits in the position word, the synchronization mark, and any additional symbol. If the count matches the predetermined number, all of the bits of the word have been detected. If buffer 131 is not all "1"s, the synch mark is not detected, or not all the bits have been detected, "NO", step 150 posts "INVALID" for the next word.

The next test is to compare the next position word 144 from buffer 130, in step 152, to the sequenced position word from sequencer 138. Since the next position word is next in the sequence, the words must match for the detected position word to be valid. Alternatively, the previous position word may be saved and the comparison will be to determine if the position words vary by the single incrementing amount. Thus, step 155 determines whether the previous position word and the next position word are in sequence. If not, "NO", step 150 posts the invalidity of the detected word.

In accordance with the present invention, the correct calculated position word has been generated in step 139 by sequencer 138. Thus, the system tolerates the invalid detection of the word. In accordance with the present invention, a predetermined threshold 160 is set to limit the number of invalid words that are tolerated. The posting of invalidity, in step 150, is provided to a counter. In step 161, the count, representing the number of consecutive invalid words, is compared to the threshold 160. An example of the threshold is five consecutive invalid words. Upon meeting the threshold, "YES", position word validity detector 145 provides an "ERROR" signal on line 163 in step 164.

The "ERROR" signal is utilized by the robust decoder to begin a new initial acquisition of the word.

If the position words are in sequence, "YES" in step 155, step 170 posts the position word as "VALID", and step 171 resets the count of the counter of step 150 to zero. If not done in step 140, sequencer 138, in step 172 provides the calculated position word at output 174, and cycles back to step 136 for the new word. Activation of the "VALID" signal indicates the calculated LPOS word is valid.

Hence, in accordance with the present invention, each bit has been robustly detected with tolerance for undetected peaks, and the sequence of position words has been robustly provided with tolerance for invalid position words.

FIGS. 10–13 illustrate a detailed example of logic in accordance with the present invention for robustly detecting the data modulated into a timing based servo pattern.

Figure 10:
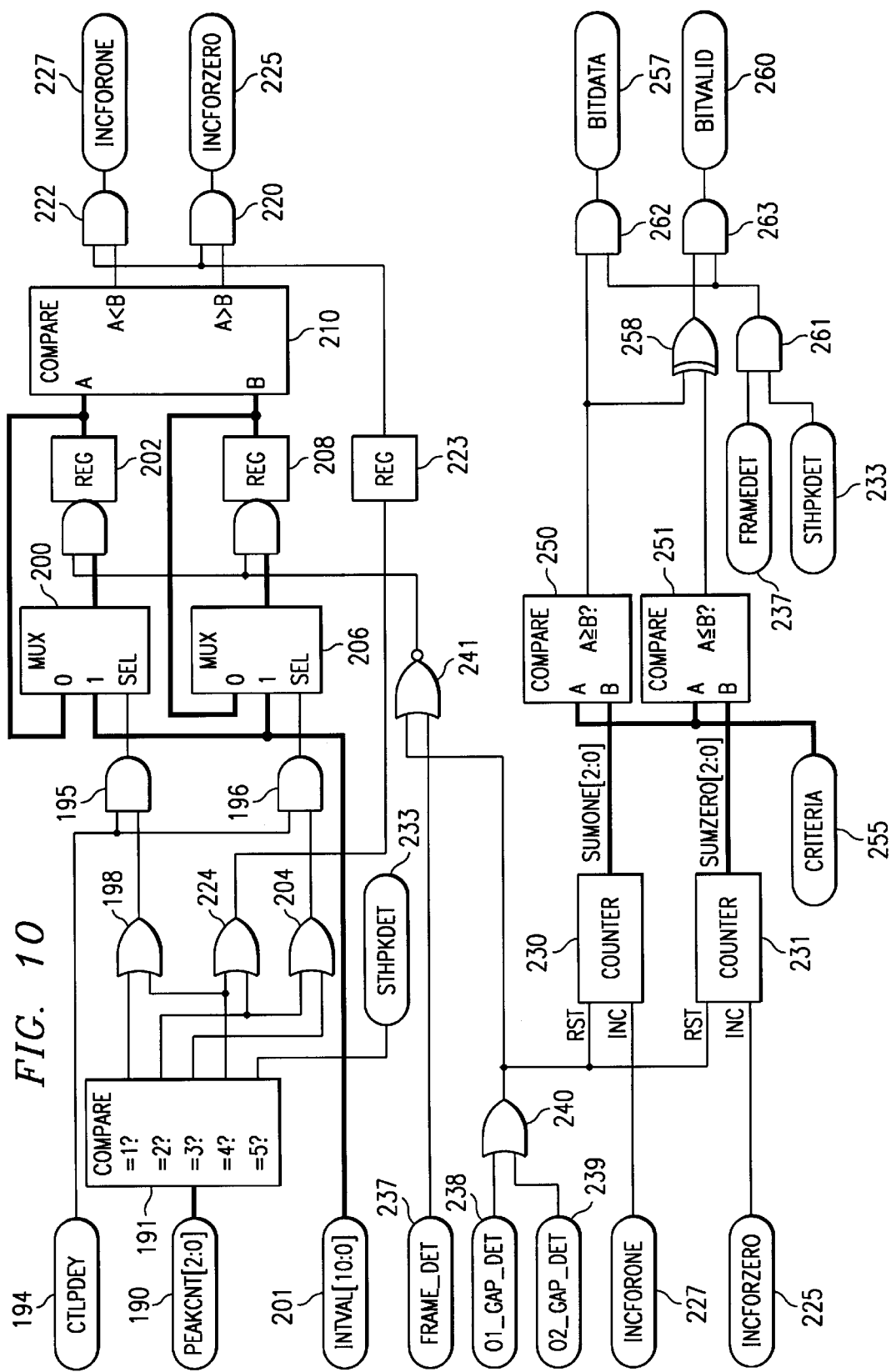

Referring to FIG. 10, with reference to FIGS. 5A and 5B, a bit detector is illustrated in accordance with the present invention. The detected peak count is supplied from the servo system at input 190 to compare logic 191. A control 194 activates the bit detection at ANDs 195 and 196. Thus, at a peak count of "1", compare logic 191 provides a signal to OR 198, gated by AND 195 to select multiplexor 200. Multiplexor 200 loads the first detected timing interval, "a", of the frame from input 201 into register 202. At the next peak count of "2", compare logic 191 provides a signal to OR 204, gated by AND 196 to select multiplexor 206. Multiplexor 206 thus loads the next timing interval, "b", of the frame from input 201 into register 208. Thus, registers 202 and 208 respectively provide the timing intervals "a" and "b" to compare logic 210 at inputs "A" and "B", which compares the two inputs. If the timing interval at input "A" is greater than that at input "B", a "0", compare logic 210 provides an output to AND 220, indicating that zero is to be incremented. Conversely, if the timing interval at input "B" is greater than that at input "A", a "1", compare logic 210 provides an output to AND 222, indicating that one is to be incremented.

The compare logic 191 output to OR 224 additionally operates register 223 which gates the ANDs 220 and 222 to provide the comparison signal on output 227 or 225 to increment the appropriate counter 230 or 231.

At each subsequent peak count within a burst, compare logic 191 continues to load the appropriate timing intervals into registers 202 and 208 for comparison by compare logic 210, and register 223 gates the resultant outputs for incrementing the appropriate counter 230 or 231 for each selected comparison of the frame. The fifth peak in each burst is identified at output 233 and employed to control the timing of the bit output and to reset the peak count 190. Additionally, the fifth peak detection is employed by the servo system together with gap detection and the direction of the tape to provide frame detection 237.

Frame detection 237, and detection of the gap between bursts of a half frame 238 or the gap between the 5 and 4 transition bursts 239, supplied by OR 240, are supplied to NOR 241 to block any timing interval signals from registers 202 or 208. Thus, only the timing intervals between peaks within a burst are compared, avoiding errors if a peak is missed by not comparing erroneous timing intervals.

In accordance with the present invention, upon detection of a frame at input 237, counters 230 and 231 are reset, and the respective counter outputs are compared by compare logic 250 and 251 to the predetermined criteria provided at input 255. As discussed above, the criteria is set to the desired value to insure a robust detection of the bit. Thus, if the "1" count from counter 230 meets or exceeds the criteria, compare logic 250 provides a signal at output 257, which represents a bit value of "1", and exclusive OR 258 provides a bit valid signal at output 260. If the "0" count from counter 231 meets or exceeds the criteria, compare logic 251 provides a signal to exclusive OR 258 for output 260, which indicates that the absence of the "1" bit on output 257 is correct, and that the bit is therefore a "0".

The timing of the output bits is controlled by the 5th bit count 233 ANDed 261 to the frame detection 237, and employed to gate ANDs 262 and 263.

Thus, in accordance with the present invention, a robust detection is made of each bit of the total word.

Figure 11:
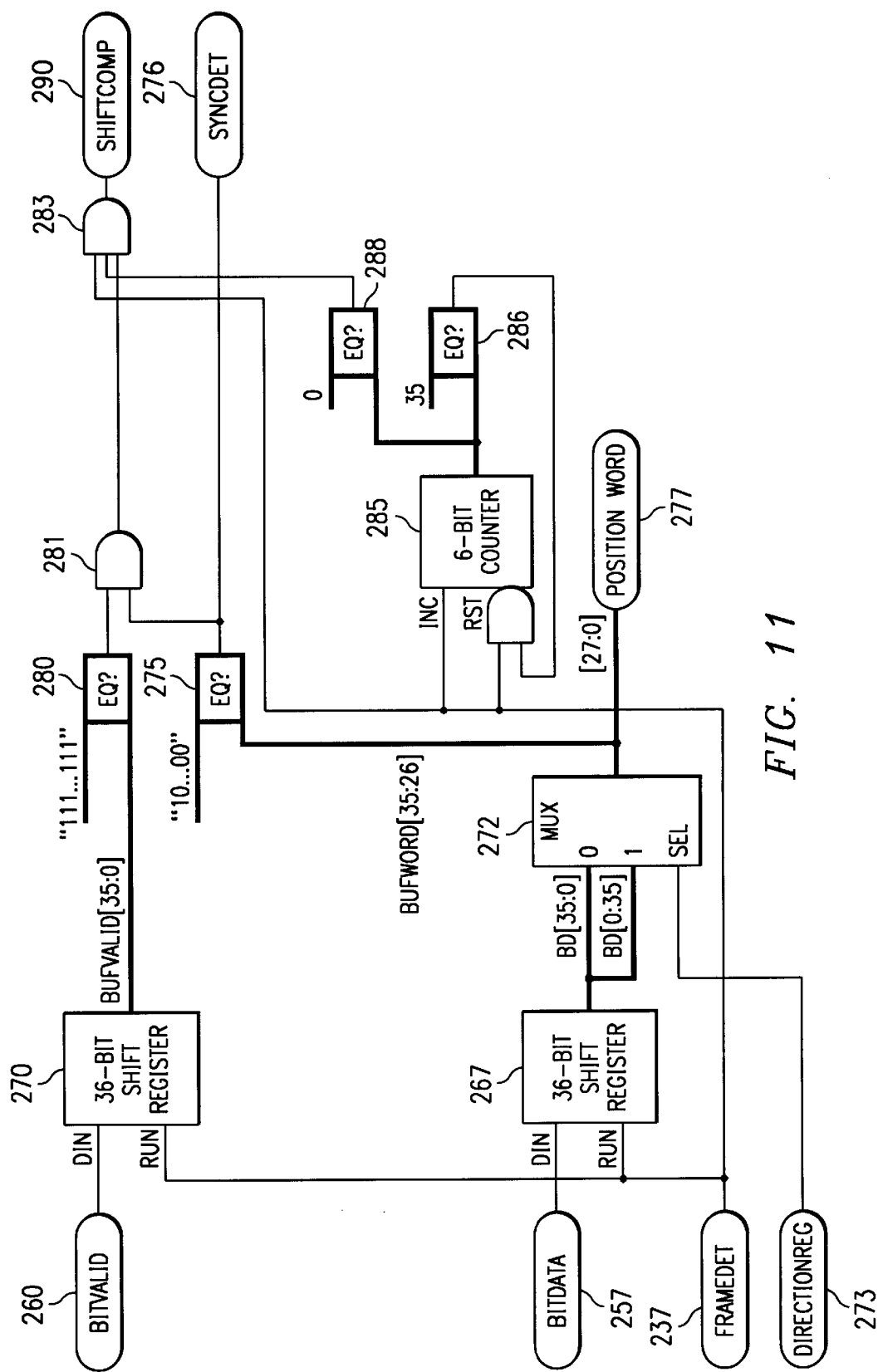

The bits are accumulated into words in FIG. 11. The bit data output 257 is provided to shift register 267, and the bit valid output 260 is provided to shift register 270. The shift registers shift one bit upon receipt of the frame detection signal at input 237. (Direction logic and validity check logic are not shown, but are understood by those of skill in the art.) Thus, each valid bit for the word is loaded into shift register 270 and each bit of the total word is loaded into shift register 267. The ordering of the bits of the word is controlled by a multiplexor 272 in response to the direction input 273. The bits representing the synchronization character part of the word are provided to compare logic 275 for comparison to the synchronization character. Detection of the synchronization character indicates that the entire word has been loaded into the shift register 267, and compare logic 275 provides a synchronization detect signal at output 276. The position word portion of the total word is provided at output 277.

Two determinations of validity of the position word are then made. The valid bits of register 270 are provided to compare logic 280 to be compared to a string of all "1"s, and if all the bits are valid, or "1", compare logic provides a signal to AND 281. Upon the detection of the synchronization character, compare logic 275 gates the AND 281, providing one validity determination to AND 283. The other determination of validity is made by counter 277, which counts the number of frames detected at input 237. When the last frame of the word is received, compare logic 286 resets the counter 285 to zero. The resetting of the counter 285 causes compare logic 288 to send a signal to AND 283. If both the synchronization character detection 275 and the completed shift count 288 occur simultaneously, the word is a valid word (even if the bits forming the position word are incorrect), and a shift complete signal is provided at output 290.

Figure 12:
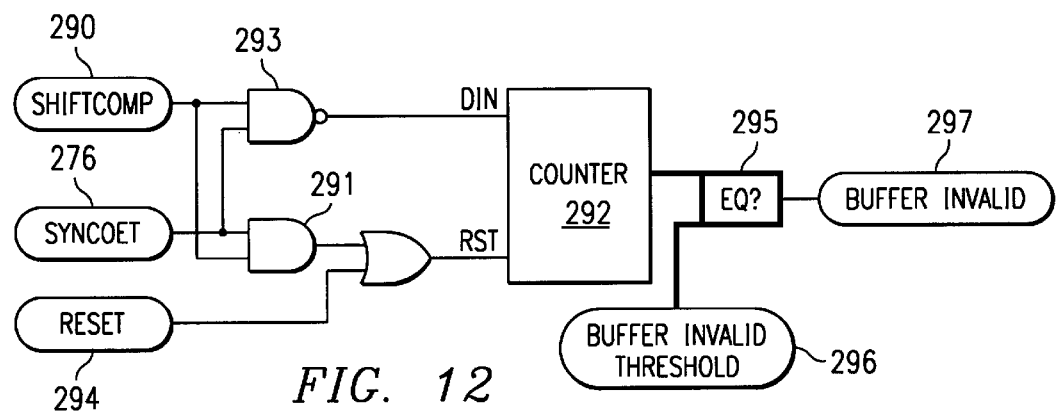
FIGS. 10–13 are diagrammatic representations of detailed embodiments of the bit and position word detectors of FIGS. 8 and 9.

The shift complete output 290 and the synchronization detection output 276 are provided to FIG. 12. If both are present, AND 291 resets counter 292. If either or both are not present, and one or both is missing, NAND 293 increments the counter 292, indicating that the contents of the buffer was not valid. The counter may be operated by the servo system to increment at the correct time, and a reset may be supplied at input 294. Compare logic 295 compares the count of counter 292 to a predetermined threshold 296 which is the number of consecutive times that an invalid word is tolerated. Upon the count equaling the threshold, a signal is sent on output 297 indicating a buffer error. This signal may comprise an error output as discussed above with respect to FIG. 9.

Figure 13:
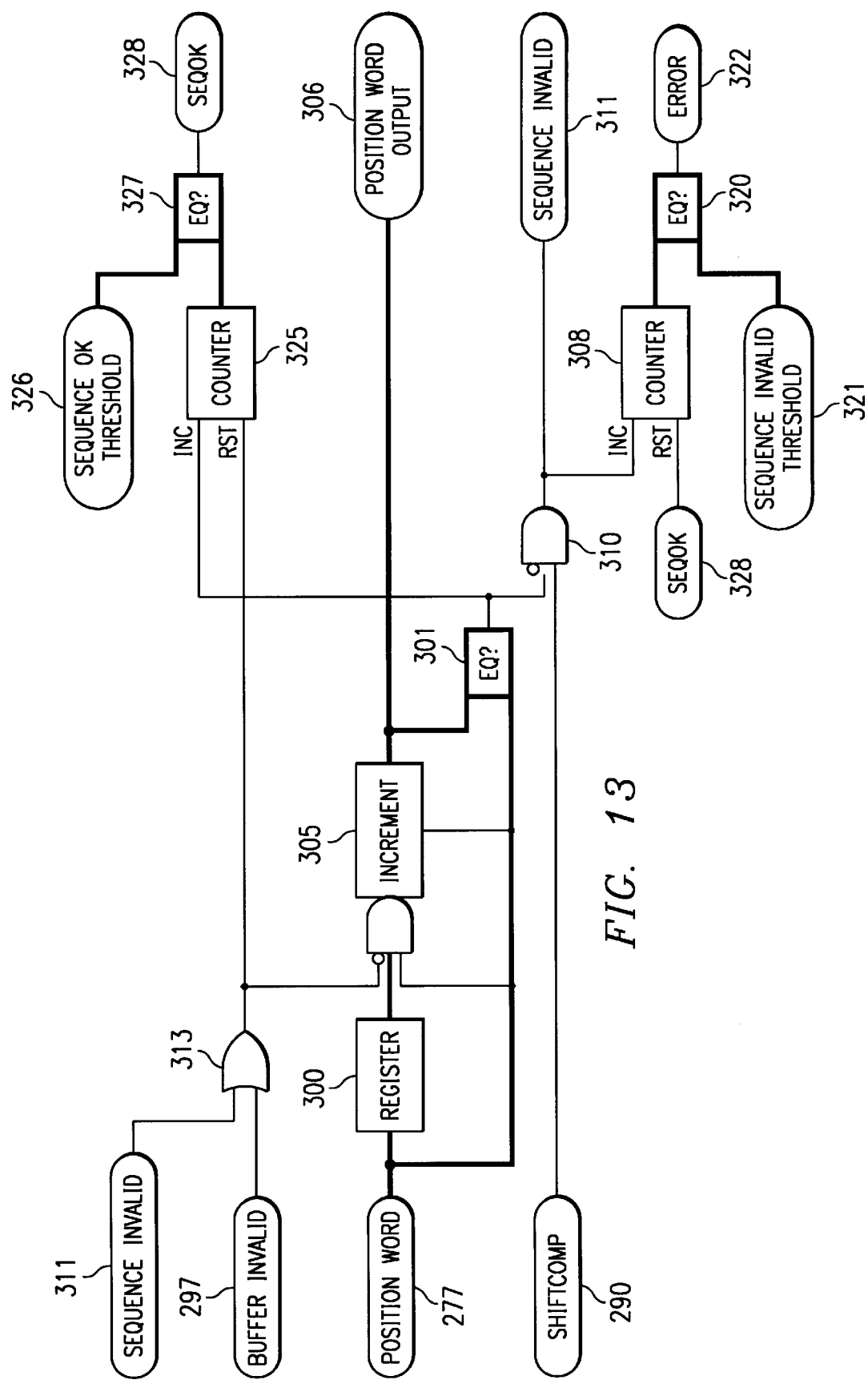

The detected position word 277 is provided to register 300 and to compare logic 301 in FIG. 13. In accordance with the present invention, the previous position word is incremented by incrementor 305 in response to a shift complete signal 290, and the position word is provided at output 306. Compare logic 301 compares the incremented previous position word from incrementor 305 to the position word appearing at input 277, and provides an output if they are equal. If they are equal, the sequence is valid. If they are not equal at the time the shift is complete, AND 310 provides a signal at output 311 indicating that the sequence is not valid. This signal also increments invalid sequence counter 308. Both the buffer invalid signal at output 297 and the sequence invalid signal at output 311 are provided to OR 313. If neither signal is present, the detected position word in register 300 is correct, and the detected position word is gated to incrementor 305.

In accordance with the present invention, counter 308 counts the number of detected position words that are not in sequence, and compare logic 320 compares the count to a predetermined sequence threshold 321. Upon meeting the invalid sequence threshold, an error is posted at output 322.

To provide additional robustness, the valid sequence output 301 is supplied to increment counter 325, where the count is compared to a sequence OK threshold 326 by compare logic 327. Upon having the thresholded number of valid sequences, output 328 indicates the sequence is OK and resets invalid sequence counter 308.

Thus, in accordance with the present invention, the incremented (or decremented) position words are continually provided at output 306 to provide a robust detection, and an error is posted only when a sequence error threshold 321, or when a buffer error threshold 296 is met.

While the preferred embodiments of the present invention have been illustrated in detail, it should be apparent that modifications and adaptations to those embodiments may occur to one skilled in the art without departing from the scope of the present invention as set forth in the following claims.

We claim:

1. Method for detection of data modulated into a timing based servo pattern prerecorded on a media, said timing based servo pattern having frames of repeated pairs of non-parallel transition stripes arranged in two bursts, one of each of said pairs in one of said bursts, said bursts separated by servo gaps, ones of said frames having said modulated data comprising shifts of at least one of said pairs of transition stripes in the longitudinal direction of said media relative to the other of said pairs of transitions stripes, said shifts of ones of said pairs in first directions representing a binary "0", and said shifts of ones of said pairs in second directions, opposite to said first directions, representing a binary "1", said method in a servo system which senses said transition stripes in said longitudinal direction of said media during relative motion with respect to said media, and detects the timing intervals between sequential said transition stripes within said bursts in said ones of said frames, comprising the steps of:

comparing selected ones of said detected timing intervals to other selected ones of said detected timing intervals;

determining whether said compared selected timing intervals identify a shift of said detected transition stripes representing a "0", or a "1";

incrementing the number of said compared selected timing intervals representing a "0" in each said detected frame, resetting said incremented number to zero at the beginning of each said detected frame;

incrementing the number of said compared selected timing intervals representing a "1" in each said detected frame, resetting said incremented number to zero at the beginning of each said detected frame;

at the end of each said detected frame, comparing said incremented numbers representing a "0" and representing a "1" to a predetermined criteria, determining which of said incremented numbers meets said criteria; and responding to said determined one of said "0" or "1" incremented numbers meeting said criteria, identifying the corresponding "0" or "1" as the bit value for said detected frame.

2. The method of claim 1, wherein said predetermined criteria comprises a number representing more than one-half of said timing interval comparisons.

3. The method of claim 2, additionally comprising the step of counting said transition stripes in each said burst of each said detected frame, comparing said count to a predicted number of said transition stripes, and, upon said count and said predicted number being unequal, ignoring, in said incremented number comparing step, said incremented numbers of said transition stripe intervals for said burst.

4. The method of claim 2, wherein said ones of said frames of repeated pairs of transitions having said modulated data, each comprises 5 pairs of said transition stripes in said two bursts, the second and fourth of which comprise said shifted pairs; and wherein said comparing step selected ones of said timing intervals comprise comparing (1) in the first said burst, the interval between the first and second said transition stripes to the interval between the second and third said transition stripes, (2) in the first said burst, the interval between the third and fourth said transition stripes to the interval between the fourth and fifth said transition stripes, (3) in the second said burst, the interval between the first and second said transition stripes to the interval between the second and third said transition stripes, and (4) in the second said burst, the interval between the third and fourth said transition stripes to the interval between the fourth and fifth said transition stripes.

5. The method of claim 2, wherein said modulated data comprises linear position registration information in the form of a linear sequence of position words, said method additionally comprising the steps of:

storing each said identified bit value for each said detected frame for said position word;

determining whether said stored position word of said storing step is valid;

responding to a valid determination in said valid determination step, identifying said stored position word as "valid".

6. The method of claim 5, wherein said valid determination step comprises determining whether each bit of said stored position word of said storing step is valid.

7. The method of claim 6:

additionally comprising the step of determining whether said stored position word and an immediately preceding position word are sequential in said linear sequence; and wherein said valid determination step additionally comprises responding to said linear sequence sequential determination, identifying said position word as "valid".

8. The method of claim 7, additionally comprising the steps of:

calculating the next sequential position word from said immediately preceding binary word value; and providing said calculated next sequential position word at a binary word output.

9. The method of claim 8, additionally comprising the step of:

responding to said valid determining step determining said stored position word is "invalid", or said sequential determination step determining said stored position word is not sequential in said linear sequence, and identifying said stored position word as "invalid".

10. The method of claim 9, additionally comprising the steps of:

responding to said "invalid" identifying step identifying said stored position word "invalid", determining the number of said "invalid" stored position word since a last said "valid" stored position word;

comparing said number of said "invalid" stored position words to a predetermined threshold; and upon said number of said "invalid" stored position words exceeding said threshold, providing an "error" signal.

11. The method of claim 8, wherein said providing said calculated next sequential position word step additionally comprises identifying said position word output as "valid".

12. The method of claim 5, wherein each said position word comprises a predetermined number of said bits and a synchronization mark, and wherein said word validity determining step comprises counting the number of said identified bits to said predetermined number, and, upon said comparison indicating said numbers match, determining said stored position word is valid.

13. A detector for detecting data modulated into a timing based servo pattern prerecorded on a media, said timing based servo pattern having frames of repeated pairs of non-parallel transition stripes arranged in two bursts, one of each of said pairs in one of said bursts, said bursts separated by servo gaps, ones of said frames having said modulated data comprising shifts of at least one of said pairs of transition stripes in the longitudinal direction of said media relative to the other of said pairs of transitions stripes, said shifts of ones of said pairs in first directions representing a binary "0", and said shifts of ones of said pairs in second directions, opposite to said first directions, representing a binary "1", in a servo system having a sensor which senses said transition stripes in said longitudinal direction of said media during relative motion with respect to said media, and having an interval detector coupled to said sensor detecting the timing interval between sequential said transition stripes within said bursts in said ones of said frames, said detector comprising:

interval comparison logic coupled to said interval detector comparing selected ones of said detected timing intervals to other selected ones of said detected timing intervals and providing signals indicating whether said compared selected timing intervals identify a shift of said transition stripes representing a "0", or a "1";

a first counter coupled to said interval comparison logic and responsive to each said signal indicating said compared selected timing intervals representing a "0", incrementing the number of said compared selected timing intervals representing a "0" in each said detected frame, resetting said incremented number to zero at the beginning of each said detected frame;

a second counter coupled to said interval comparison logic and responsive to each said signal indicating said compared selected timing intervals representing a "1", incrementing the number of said compared selected timing intervals representing a "1" in each said detected frame, resetting said incremented number to zero at the beginning of each said detected frame; and bit comparison logic coupled to said first and second counters, comparing, at the end of each said detected frame, said incremented numbers representing a "0" and representing a "1" to a predetermined criteria, determining which of said incremented numbers meets said criteria, and, upon one of said "0" or "1" incremented numbers meeting said criteria, providing an output signal identifying the corresponding "0" or "1" as the bit value for said detected frame.

14. The detector of claim 13, wherein said predetermined criteria comprises a number representing more than one-half of said timing interval comparisons.

15. The detector of claim 14, additionally comprising a stripe counter coupled to said sensor, counting said transition stripes in each said burst of each said detected frame, comparing said count to a predicted number of said transition stripes, and, upon said count and said predicted number being unequal, operating said bit comparison logic to ignore said incremented numbers of said transition stripe intervals for said burst.

16. The detector of claim 14, wherein said ones of said frames of repeated pairs of transitions having said modulated data, each comprises 5 pairs of said transition stripes in said two bursts, the second and fourth of which comprise said shifted pairs; and wherein said interval comparison logic compares said selected timing intervals comprising (1) in the first said burst, the interval between the first and second said transition stripes to the interval between the second and third said transition stripes, (2) in the first said burst, the interval between the third and fourth said transition stripes to the interval between the fourth and fifth said transition stripes, (3) in the second said burst, the interval between the first and second said transition stripes to the interval between the second and third said transition stripes, and (4) in the second said burst, the interval between the third and fourth said transition stripes to the interval between the fourth and fifth said transition stripes.

17. The detector of claim 14, wherein said modulated data comprises linear position registration information in the form of a linear sequence of position words, said detector additionally comprising:

a buffer coupled to said bit comparison logic, storing each said identified bit value for each said detected frame for said position word; and a word validity detector determining whether said position word stored in said buffer is valid, and, upon each said bit being determined as valid, providing a signal identifying said position word as "valid".

18. The detector of claim 17, wherein said word validity detector determines whether each bit of said position word stored in said buffer is valid.

19. The detector of claim 18, additionally comprising sequence logic for calculating the next sequential position word from an immediately preceding position word and determining whether said stored position word is sequential in said linear sequence, and wherein said word validity detector is additionally coupled to said sequence logic, and, upon said stored position word being sequential, providing a signal identifying said stored position word as "valid".

20. The detector of claim 19, wherein said sequence logic additionally provides said calculated next sequential position word at a position word output.

21. The detector of claim 20, wherein said word validity detector, upon determining that said stored position word is invalid, providing a signal identifying said stored position word as "invalid".

22. The detector of claim 21, wherein said word validity detector additionally determines the number of said "invalid" stored position words since last said "valid" stored position word, and compares said number of said "invalid" stored position words to a predetermined threshold, and upon said number of said "invalid" stored position words exceeding said threshold, provides an "error" signal.

23. The detector of claim 20, wherein said sequence logic additionally provides a signal identifying said calculated next sequential position word at said position word output as "valid".

24. The detector of claim 17, wherein each said position word comprises a predetermined number of said bits and a synchronization mark, and wherein said word validity detector additionally counts the number of said identified bits to said predetermined number, and, upon said comparison indicating said numbers match, providing a signal identifying said stored position word as "valid".

* * * * *